United States Patent [19]

Kudo

[11] Patent Number: 4,587,561
[45] Date of Patent: May 6, 1986

[54] NOISE REDUCTION CIRCUIT ARRANGEMENT OF SOLID-STATE VIDEO CAMERA

[75] Inventor: Hiroshi Kudo, Katsuta, Japan
[73] Assignee: Hitachi, Ltd., Tokyo, Japan
[21] Appl. No.: 542,990
[22] Filed: Oct. 18, 1983
[30] Foreign Application Priority Data Oct. 20, 1982 [JP] Japan .................... 57-182820

[51] Int. Cl.$^4$ .................... H04N 5/217
[52] U.S. Cl. .................... 358/167; 358/904
[58] Field of Search .................... 358/167, 38, 162, 166, 358/36, 904, 211

[56] References Cited

U.S. PATENT DOCUMENTS

| | | | |
|---|---|---|---|
| 2,717,931 | 9/1955 | Duke | 358/904 |
| 3,333,055 | 7/1967 | Krause | 358/167 |
| 3,872,387 | 3/1975 | Banach | 358/904 |

Primary Examiner—Tommy P. Chin
Attorney, Agent, or Firm—Antonelli, Terry & Wands

[57] ABSTRACT

A noise reduction circuit arrangement for video signals under low brightness condition has a high-pass filter which detects the level of a video signal to switch the amount of passage of a high-frequency band component in accordance with a magnitude of the level. The video signal, produced from an image pickup element, is supplied to a low-pass filter and the high-pass filter. The high-frequency band component produced from the high-pass filter and changed in amplitude in accordance with the level of the video signal and a low-frequency band component produced from the low-pass filter are added at an adder so as to effect aperture correction in principle. The high-frequency band to be added is so controlled as to more decrease when the brightness of the video signal is low than when the brightness is not low.

12 Claims, 6 Drawing Figures

NOISE REDUCTION CIRCUIT ARRANGEMENT OF SOLID-STATE VIDEO CAMERA

This invention relates to a noise reduction circuit arrangement of a video camera and more particularly to a noise reduction circuit arrangement suitable for reducing noises under low brightness operation of a video camera of the type which utilizes a solid-state image pickup device (semiconductor image pickup device) as an imaging element. As well known in the art, the solid-state image pickup device for use in such a solid-state video camera has low sensitivity to photoelectric conversion and suffers from large noise outputs as compared to image pickup tubes which inherently have high sensitivity. Therefore, in the solid-state video camera, a problem has arisen wherein the S/N ratio is degraded especially when brightness signals corresponding to brightness of an object are low, that is, the video camera operates under low brightness conditions.

To solve this problem, it has been conceived to use a noise reduction circuit which has an aperture correction circuit and a base clipper circuit in combination as shown in FIG. 1.

More particularly, a video signal produced from an image pickup device is fed to a low-pass filter 2 and a high-pass filter 3 so as to be divided into a low-frequency band component and a high-frequency band component. These components are then amplified at buffer amplifiers 4a and 4b, respectively, to have desired amplitudes and subsequently added at an adder circuit 10. In this manner, aperture correction can be effected. Especially, taking into consideration the fact that the high-frequency band component standing for the output of the high-pass filter 3 contains the majority of noise components, amplitude components of the high-frequency band component which are below a predetermined amplitude level are removed by a base clipper circuit 1 prior to adding the high-frequency band component and the low-frequency band component at the adder circuit 10, thereby reducing noises.

However, the noise reduction circuit is invalid for reduction of noises contained in signals of large level because the base clipper circuit 1 uniformly cuts off signals referenced to the invariably predetermined small level and besides, this noise reduction circuit has an effect on medium and high brightness signals inclusive of a small amount of noises because signals are cut off at a fixed level irrespective of the magnitude of amplitude of the brightness signals. As a result, useful signals, so long as they are small in level, are all blackened on display.

This invention contemplates elimination of the prior art drawbacks and has for its object to provide a noise reduction circuit arrangement suitable for use in a solid-state video camera which can significantly be directed to reduce noises under low brightness operation in which degradation of the S/N ratio is imminent.

To accomplish the above object, according to this invention, frequency characteristics of one channel for a high-frequency band component included in channels constituting an aperture correction circuit are changed in accordance with the magnitude of amplitude of an input video signal so that the amount of the high-frequency band component can be more decreased when brightness of the video signal is low than when brightness of the video signal is high.

Advantageously, according to this invention, the high-frequency band component can be decreased to reduce noises in an output video signal under low brightness operation whereas the delivery of the high-frequency band component inclusive of a small amount of noises under high brightness operation can be sufficient, thereby ensuring that output video signals effective to provide pictures of high quality can be obtained. Since gain of the channel for passage of the high-frequency band component is relatively decreased for an input signal inclusive of a large amount of noises under the low brightness operation to reduce noises being delivered out, the base clipper circuit can be dispensed with. Accordingly, the elimination of the useful signals by the base clipper circuit does not occur and pictures of high quality can be obtained.

The present invention will be apparent from the following detailed description taken in conjunction with the accompanying drawings, in which.

Figure 1:
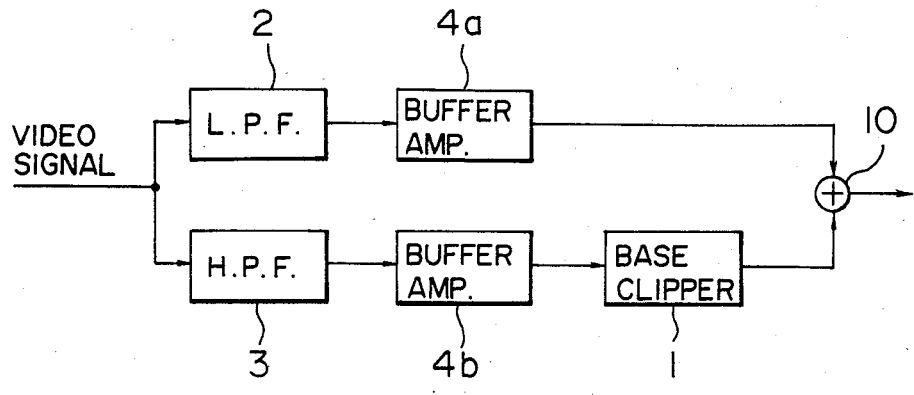
FIG. 1 is a block diagram of a prior art noise reduction circuit arrangement.
Figure 2:
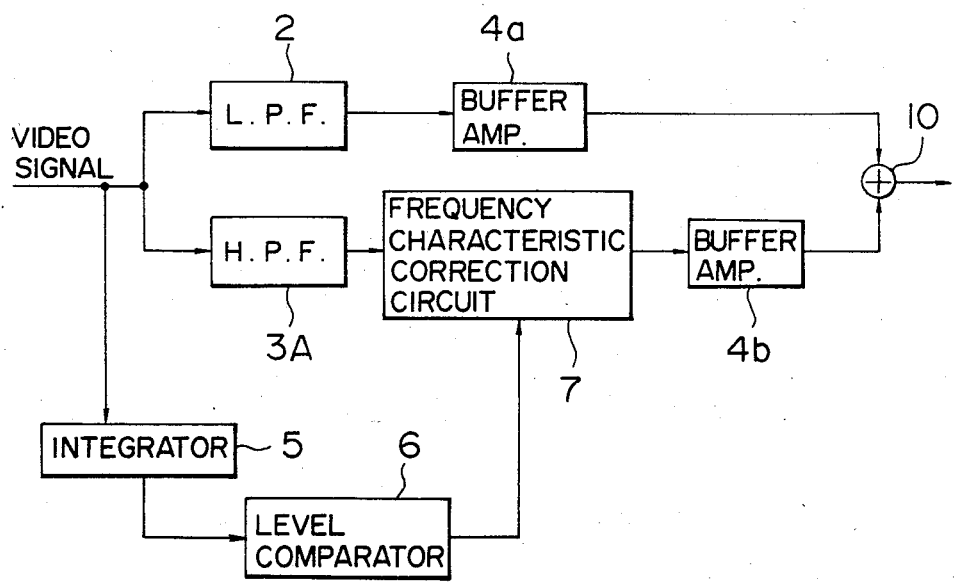
FIG. 2 is a block diagram showing one embodiment of a noise reduction circuit arrangement according to the invention.

Reference should now be made to FIG. 2. There is shown therein in block form one embodiment of a noise reduction circuit arrangement under low brightness operation. This embodiment is particularly adapted for a case wherein a frequency characteristic as viewed from the output of a high-pass filter 3A to be described later has such a pass characteristic that decreases in a frequency band which is lower than a high-frequency band inclusive of a large number of noises. In FIGS. 1 and 2, like element are designated by like reference numerals. In FIG. 2, there are also provided an integrator circuit 5, a level comparator 6, and a correction circuit 7 adapted to change high frequency characteristics.

In FIG. 2, a video signal is fed to a low-pass filter 2 and the high-pass filter 3A and at the same time, also applied to the integrator circuit 5 which in turn produces a signal of a level in accordance with a magnitude of amplitude of the input video signal. Subsequently, the level comparator 6 compares the output level of the integrator circuit 5 with a reference level to produce a first control signal when the output level is higher than the reference level and a second control signal when the output level is lower than the reference level.

In other words, the reference level is so set that the first control signal is delivered out when the input video signal has medium or high brightness and the second control signal is delivered out when the brightness is low.

Subsequently, the frequency characteristic correction circuit 7 operates to slightly enhance a high-frequency band component of the video signal delivered out of the high-pass filter 3A when receiving the first control signal but not to enhance the same when receiving the second control signal. Accordingly, under the medium or high brightness operation in which degradation of the S/N ratio is not imminent, a low-frequency band component delivered out of the low-pass filter 2 and the high-frequency band component from the high-pass filter 3A being slightly increased are fed to an adder circuit 10 through buffer amplifiers 4a and 4b, respectively. Thus, an output video signal which is improved in frequency characteristics can be delivered out of the adder circuit 10.

On the other hand, when the second control signal is produced from the level comparator 6, the frequency characteristics or frequency/response characteristic of the frequency characteristic correction circuit 7 is so set that the output from the high-pass filter 3A is amplified to an extent that the high-frequency band component inclusive of a number of noises is not passed, and the thus amplified high-frequency band component is applied to the adder circuit 10 through the buffer amplifier 4b, which in turn adds this component and a low-frequency band component sent from the low-pass filter 2 through the buffer amplifier 4a. Consequently, an output video signal removed of the high-frequency component inclusive of a number of noises, in comparison with the aforementioned video signal which is improved in frequency characteristics, can be delivered out of the adder circuit 10.

Figure 3:
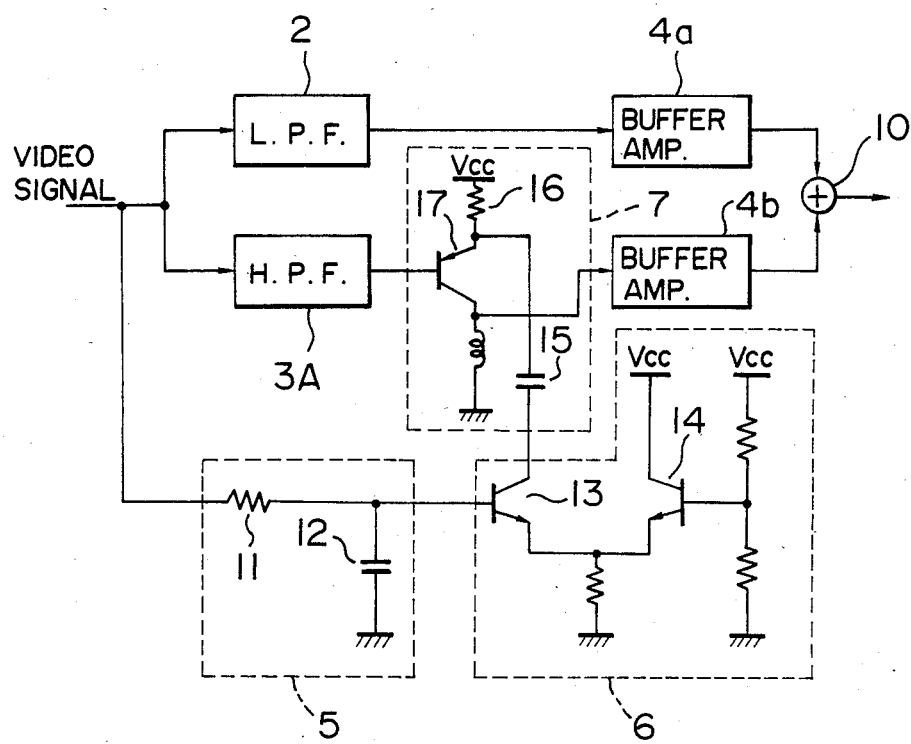
FIG. 3 is a circuit diagram specifying essential parts of the embodiment shown in FIG. 2.

The embodiment of FIG. 2 will now be described in greater detail with reference to FIG. 3. In FIGS. 2 and 3, like reference numerals represent like elements.

As diagrammatically shown in FIG. 3, the integrator circuit 5 comprises a resistor 11 and a capacitor 12 and the video signal applied to the integrator circuit 5 is smoothed thereby and sent to the level comparator 6 which is a difference circuit constituted by, for example, a pair of transistors having emitters connected in common. The smoothed signal is applied to the base of one transistor 13 of the difference circuit. Applied to the base of the other transistor 14 is a reference bias of a predetermined value. The transistor 13 is turned on by being applied with a base voltage which is higher than that applied to the other transistor 14.

Thus, the one transistor 13 is turned on under medium or high brightness operation and turned off under low brightness operation. With this transistor 13 turned on, it follows that a capacitor 15 is equivalently connected in parallel with a resistor 16 as will be seen from FIG. 3. Consequently, under this condition, gain of a transistor 17 increases as compared to a case wherein the transistor 13 is turned off as will be described below.

Under low brightness operation, on the other hand, the transistor 13 is turned off as described previously with the result that the capacitor 15 is equivalently disconnected from the resistor 16. Accordingly, the capacitor 15 has no effect on the gain of the transistor 17. Obviously, under this condition, the gain of the transistor 17 decreases as compared to the case wherein the capacitor 15 is equivalently connected in parallel with the resistor 16 as described previously.

Figure 4:
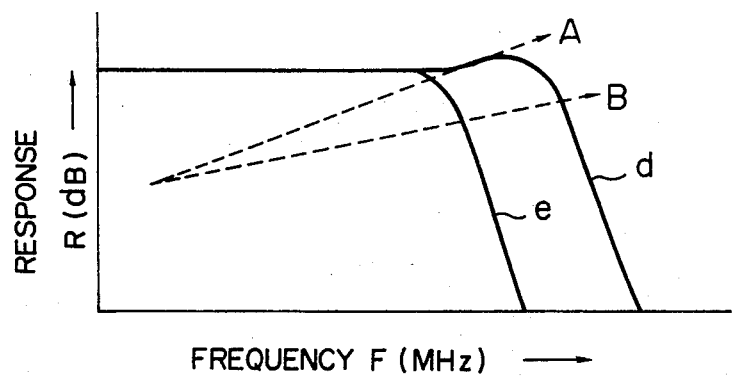
FIG. 4 shows frequency characteristics useful in explaining the operation of the FIG. 3 circuit.

Such a change of the gain of the transistor 17 may be considered in terms of frequency characteristics of the entire circuit, that is, frequency characteristics as viewed from the output of the adder circuit 10 and illustrated as shown in FIG. 4. More particularly, under a condition that the capacitor 15 has an effect on the gain of the transistor 17 when the capacitor is equivalently connected in parallel with the resistor 16, a frequency characteristic as represented by a curve d is obtained whereby response R (dB) is raised near the fall of a frequency characteristic represented by a curve e which is obtained in the absence of the aforementioned influence.

Consequently, the high-frequency band component fed to the adder circuit 10 through the buffer amplifier 4b can be extended. When, on the other hand, the capacitor 15 has no effect on the gain of the transistor 17, the frequency characteristic represented by curve e is obtained as described previously. Under this condition, the high-frequency band component inclusive of a large number of noises is cut off.

The remaining circuits in FIG. 3 operate in a similar manner to those in FIG. 2 and will not be described herein. In the embodiments shown in FIGS. 2 and 3, the base clipper circuit 1 is not provided for the high-frequency band component channel but it may be provided if the noise reduction effect by the high-pass filter 3A is insufficient. Since, in this case, the noise has already been reduced in comparison with that in the prior art circuit, the clipping level may be set to a smaller value than that of the prior art circuit. Consequently, the unwanted elimination of the useful signals can be suppressed, thereby making it possible to obtain pictures of high quality.

The provision of the paired buffer amplifiers 4a and 4b is not always necessary if impedance matching in the adder circuit 10 is complete, and the ratio between two signal amplitudes to be added together may be adjusted by the adder circuit 10. Additionally, in FIG. 4, a dashed curve A represents the gain which the circuit 7 comprised of the transistor 17 assumes when the capacitor has an effect on the gain of the transistor 17 and a dashed curve B represents the gain of the circuit 7 in the absence of the influence.

Figure 5:
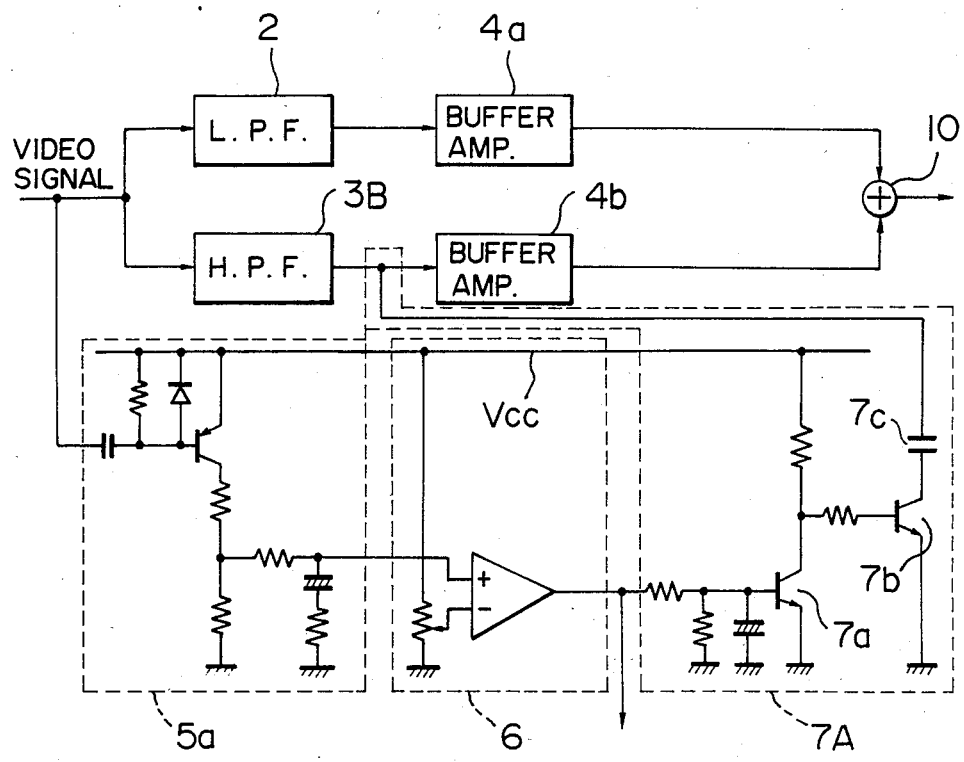
FIG. 5 is a circuit diagram showing another embodiment of the invention.

Referring now to FIG. 5, another embodiment of the noise reduction circuit arrangement under low brightness operation will be described. This embodiment is particularly adapted for a case wherein a frequency characteristic as viewed from the output of a high-pass filter 3B to be described later has a pass characteristic by which the output decreases in a frequency band for the high-frequency band component inclusive of a large number of noises. In FIGS. 2 and 5, like reference numerals designate like elements. In FIG. 5, there are also provided a video detector 5a including a rectifier element and a correction circuit 7A adapted to change high frequency characteristics.

In FIG. 5, upon application of a video signal to the video detector 5a, a signal of a level in accordance with a magnitude of amplitude of the video signal is produced from the video detector 5a in a manner well known in the art. Subsequently, a level comparator 6 compares the level of the output signal from the video detector 5a with a predetermined reference level to produce a high level control signal when the output signal is higher than the reference level and a low level control signal when the output signal is lower than the reference level.

In the correction circuit 7A adapted to change high frequency characteristics, a transistor 7a is turned on and a transistor 7b is turned off when the high level control signal is produced, that is, when the video signal is of medium or high brightness, so that a capacitor 7C floats and hence the output of the high-pass filter 3B is directly fed to a buffer amplifier 4b. Thus, under this condition, each of the video detector 5a, level comparator 6 and high frequency correction circuit 7A has no effect on an aperture correction circuit.

On the other hand, when the low level control signal is produced, that is, when the video signal is of low brightness, the previous condition is inverted to render the transistor 7a off and the transistor 7b on, so that the high-frequency band component inclusive of a large number of noises being produced from the high-pass filter 3B is bypassed to ground through the capacitor 7C.

Consequently, an output video signal with a reduced noise under low brightness operation can be delivered out of an adder circuit 10. The aforementioned control signal may also be used as a signal for automatic iris control and automatic gain control circuits (not shown) of the video camera.

Figure 6:
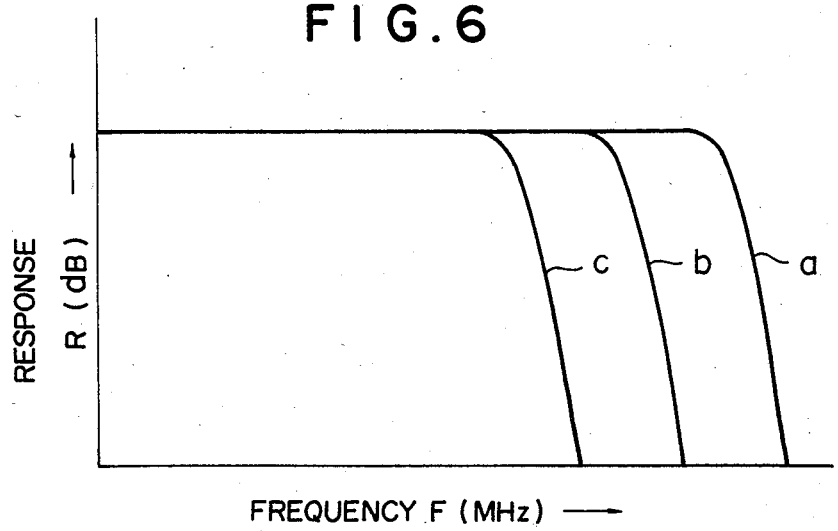
FIG. 6 shows frequency characteristics useful in explaining the operation of the FIG. 5 circuit.

Incidentally, the capacitance of the capacitor 7C included in the correction circuit 7A must be set to a value which can reduce the noises without disturbing the video signal. This is because as the capacitance increases, the frequency characteristic of the signal fed from the high-pass filter 3B to the buffer amplifier 4b changes as shown at curves a, b and c in FIG. 6. An unduly large capacitance will not eliminate the noises only to cut off the video signal.

On the same ground as for FIG. 3, a base clipper circuit 1 may be provided for the high-frequency band component channel or the paired buffer amplifiers 4a and 4b may be dispensed with.

I claim:

1. A noise reduction circuit arrangement under low brightness operation of a video camera comprising:
    low-pass filter means supplied with a video signal produced from an image pickup element, for passing a low-frequency band component of the video signal;
    high-pass filter means supplied with the video signal produced from the image pickup element, for passing a high-frequency band component of the video signal;
    level detector means detecting the level of the video signal, for producing a control signal in accordance with a degree of brightness of the video signal;
    correcting means responsive to the control signal produced from said level detector means, for controlling frequency characteristics of the high-frequency band component of the video signal passed through and produced from said high-pass filter means such that the amount of the high-frequency band component is more decreased when brightness of the video signal is low than when the brightness is not low; and
    adder means for adding the low-frequency band component from said low-pass filter means and the high-frequency band component produced from said high-pass filter means and controlled by said correcting means;
    said correcting means comprising variable gain amplifier means which increases gain for the high-frequency band component by receiving the control signal produced from said level detector means when the brightness of the video signal is not low, said variable gain amplifier means including a transistor amplifier responsive to said control signal to switch connection and disconnection of a capacitor in parallel with an emitter resistor of the transistor amplifier.

2. A noise reduction circuit arrangement according to claim 1 wherein said video signal level detector means comprises means for integrating the video signal, and level comparator means for comparing an integrated output signal with a reference level.

3. A noise reduction circuit arrangement according to claim 1 wherein said video signal level detector means comprises rectifier means for rectifying the video signal, and level comparator means for comparing the level of a rectified output signal with a reference level.

4. A noise reduction circuit arrangement under low brightness operation of a video camera comprising:
    low-pass filter means supplied with a video signal produced from an image pickup element, for passing a low-frequency band component of the video signal;
    high-pass filter means supplied with the video signal produced from the image pickup element, for passing a high-frequency band component of the video signal;
    level detector means detecting the level of the video signal, for producing a control signal in accordance with a degree of brightness of the video signal;
    correcting means responsive to the control signal produced from said level detector means, for controlling frequency characteristics of the high-frequency band component of the video signal passed through and produced from said high-pass filter means such that the amount of the high-frequency band component is more decreased when brightness of the video signal is low than when the brightness is not low; and
    adder means for adding the low-frequency band component from said low-pass filter means and the high-frequency band component produced from said high-pass filter means and controlled by said correcting means;
    said correcting means comprising means for decreasing a cut-off frequency of said high-pass filter means by receiving the control signal produced from said level detector means when the brightness of the video signal is low, said cut-off frequency decreasing means including a capacitor for bypassing the high-frequency band component produced from said high-pass filter means, and means responsive to said control signal to effect connection and disconnection of the capacitor.

5. A noise reduction circuit arrangement according to claim 4 wherein said video signal level detector means comprises means for integrating the video signal, and level comparator means for comparing an integrated output signal with a reference level.

6. A noise reduction circuit arrangement according to claim 4 wherein said video signal level detector means comprises rectifier means for rectifying the video signal, and level comparator means for comparing the level of a rectified output signal with a reference level.

7. A noise reduction circuit arrangement under low brightness operation of a video camera comprising:
    low-pass filter means supplied with a video signal produced from an image pickup element, for passing a low-frequency band component of the video signal;
    high-pass filter means supplied with the video signal produced from the image pickup element, for passing a high-frequency band component of the video signal;
    level detector means detecting the level of the video signal, for producing a control signal in accordance with a degree of brightness of the video signal;

correcting means responsive to the control signal produced from said level detector means, for controlling frequency characteristics of the high-frequency band component of the video signal passed through and produced from said high-pass filter means such that the amount of the high-frequency band component is more decreased when brightness of the video signal is low than when the brightness is not low; and adder means for adding the low-frequency band component from said low-pass filter means and the high-frequency band component produced from said high-pass filter means and controlled by said correcting means;

said video signal level detector means including means for integrating the video signal, and level comparator means for comparing an integrated output signal with a reference level.

8. A noise reduction circuit arrangement under low brightness operation of a video camera comprising:

low-pass filter means supplied with a video signal produced from an image pickup element, for passing a low-frequency band component of the video signal;

high-pass filter means supplied with the video signal produced from the image pickup element, for passing a high-frequency band component of the video signal;

level detector means detecting the level of the video signal, for producing a control signal in accordance with a degree of brightness of the video signal;

correcting means responsive to the control signal produced from said level detector means, for controlling frequency characteristics of the high-frequency band component of the video signal passed through and produced from said high-pass filter means such that the amount of the high-frequency band component is more decreased when brightness of the video signal is low than when the brightness is not low; and adder means for adding the low-frequency band component from said low-pass filter means and the high-frequency band component produced from said high-pass filter means and controlled by said correcting means;

said video signal level detector means including rectifier means for rectifying the video signal, and level comparator means for comparing the level of a rectified output signal with a reference level.

9. A noise reduction circuit arrangement under low brightness operation of a video camera comprising:

low-pass filter means supplied with a video signal produced from an image pickup element, for passing a low-frequency band component of the video signal;

high-pass filter means supplied with the video signal produced from the image pickup element, for passing a high-frequency band component of the video signal;

level detector means detecting the level of the video signal, for producing a control signal in accordance with a degree of brightness of the video signal;

correcting means responsive to the control signal produced from said level detector means, for controlling frequency characteristics of the high-frequency band component of the video signal passed through and produced from said high-pass fitler means such that the amount of the high-frequency band component is more decreased when brightness of the video signal is low than when the brightness is not low; and adder means for adding the low-frequency band component from said low-pass filter means and the high-frequency band component produced from said high-pass filter means and controlled by said correcting means;

said correcting means including variable gain amplifier means which increases gain for the high-frequency band component by receiving the control signal produced from said level detector means when the brightness of the video signal is not low; and said video signal level detector means including means for integrating the video signal, and level comparator means for comparing an integrated output signal with a reference level.

10. A noise reduction circuit arrangement under low brightness operation of a video camera comprising:

low-pass filter means supplied with a video signal produced from an image pickup element, for passing a low-frequency band component of the video signal:

high-pass filter means supplied with the video signal produced fromt he image pickup element, for passing a high-frequency band component of the video signal;

level detector means detecting the level of the video signal, for producing a control signal in accordance with a degree of brightness of the video signal;

correcting means responsive to the control signal produced from said level detector means, for controlling frequency characteristics of the high-frequency band component of the video signal passed through and produced from said high-pass filter means such that the amount of the high-frequency band component is more decreased when brightness of the video signal is low than when the brightness is not low; and adder means for adding the low-frequency band component from said low-pass filter means and the high-frequency band component produced from said high-pass filter means and controlled by said correcting means;

said correcting means including variable gain amplifier means which increases gain for the high-frequency band component by receiving the control signal produced from said level detector means when the brightness of the video signal is not low; and said video signal level detector means including rectifier means for rectifying the video signal, and level comparator means for comparing the level of a rectified output signal with a reference level.

11. A noise reduction circuit arrangement under low brightness operation of a video camera comprising:

low-pass filter means supplied with a video signal produced from an image pickup element, for passing a low-frequency band component of the video signal;

high-pass filter means supplied with the video signal produced from the image pickup element, for passing a high-frequency band component of the video signal;

level detector means detecting the level of the video signal, for producing a control signal in accordance with a degree of brightness of the video signal;

correcting means responsive to the control signal produced from said level detector means, for controlling frequency characteristics of the high-frequency band component of the video signal passed through and produced from said high-pass filter means such that the amount of the high-frequency band component is more decreased when brightness of the video signal is low than when the brightness is not low; and adder means for adding the low-frequency band component from said low-pass filter means and the high-frequency band component produced from said high-pass filter means and controlled by said correcting means;

said correcting means including means for decreasing a cut-off frequency of said high-pass filter means by receiving the control signal produced from said level detector means when the brightness of the video signal is low; and said video signal level detector means including means for integrating the video signal, and level comparator means for comparing an integrated output signal with a reference level.

12. A noise reduction circuit arrangement under low brightness operation of a video camera comprising:

low-pass filter means supplied with a video signal produced from an image pickup element, for passing a low-frequency band component of the video signal;

high-pass filter means supplied with the video signal produced from the image pickup element, for passing a high-frequency band component of the video signal;

level detector means detecting the level of the video signal, for producing a control signal in accordance with a degree of brightness of the video signal;

correcting means responsive to the control signal produced from said level detector means, for controlling frequency characteristics of the high-frequency band component of the video signal passed through and produced from said high-pass filter means such that the amount of the high-frequency band component is more decreased when brightness of the video signal is low than when the brightness is not low; and adder means for adding the low-frequency band component from said low-pass filter means and the high-frequency band component produced from said high-pass filter means and controlled by said correcting means;

said correcting means including means for decreasing a cut-off frequency of said high-pass filter means by receiving the control signal produced from said level detector means when the brightness of the video signal is low; and said video signal level detector means including rectifier means for rectifying the video signal, and level comparator means for comparing the level of a rectified output signal with a reference level.

* * * * *